United States Patent
Muchherla et al.

(10) Patent No.: US 11,481,273 B2
(45) Date of Patent: Oct. 25, 2022

(54) PARTITIONED MEMORY HAVING ERROR DETECTION CAPABILITY

(71) Applicant: Micron Technology, Inc., Boise, ID (US)

(72) Inventors: Kishore K. Muchherla, Fremont, CA (US); Niccolo' Righetti, Boise, ID (US); Jeffrey S. McNeil, Jr., Nampa, ID (US); Akira Goda, Boise, ID (US); Todd A. Marquart, Boise, ID (US); Mark A. Helm, Santa Cruz, CA (US); Gil Golov, Backnang (DE); Jeremy Binfet, Boise, ID (US); Carmine Miccoli, Boise, ID (US); Giuseppina Puzzilli, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/995,359

(22) Filed: Aug. 17, 2020

(65) Prior Publication Data
US 2022/0050746 A1 Feb. 17, 2022

(51) Int. Cl.
*G06F 3/06* (2006.01)
*G06F 11/10* (2006.01)

(52) U.S. Cl.
CPC .......... *G06F 11/1068* (2013.01); *G06F 3/065* (2013.01); *G06F 3/0619* (2013.01);
(Continued)

(58) Field of Classification Search
CPC .. G06F 11/1068; G06F 3/0673; G06F 3/0619; G06F 3/0644; G06F 3/065; G06F 3/0656; G06F 3/0679; G06F 11/1048
(Continued)

(56) References Cited

U.S. PATENT DOCUMENTS

| 7,657,796 B1 * | 2/2010 | Kaiser ................. G06F 11/1435 714/764 |
| 8,190,971 B2 * | 5/2012 | Weiberle ............ G06F 11/1008 714/763 |

(Continued)

FOREIGN PATENT DOCUMENTS

| CN | 101903866 B | * | 7/2013 | .......... G06F 11/1441 |
| KR | 20200087486 A | | 7/2020 | |
| KR | 102143517 B1 | | 8/2020 | |

OTHER PUBLICATIONS

International Search Report and Written Opinion from related PCT Application No. PCT/US2021/046069, dated Nov. 30, 2021, 10 pages.

*Primary Examiner* — Albert Decady
*Assistant Examiner* — Enam Ahmed
(74) *Attorney, Agent, or Firm* — Brooks, Cameron & Huebsch, PLLC

(57) ABSTRACT

A memory component comprises a cyclic buffer partition portion and a snapshot partition portion. In response to receiving a signal that a trigger event has occurred, a processing device included in the memory component performs an error correction operation on a portion of data stored in the cyclic buffer partition portion, copies the data stored in the cyclic buffer partition portion to the snapshot partition portion in response to the error correction operation being successful, and sends the data stored in the cyclic buffer partition portion to a processing device operatively coupled to the memory component in response to the error correction operation not being successful.

20 Claims, 7 Drawing Sheets

(52) U.S. Cl.
CPC .......... *G06F 3/0644* (2013.01); *G06F 3/0656* (2013.01); *G06F 3/0673* (2013.01)

(58) Field of Classification Search
USPC ........................................................ 714/764
See application file for complete search history.

(56) References Cited

U.S. PATENT DOCUMENTS

| | | | |
|---|---|---|---|
| 8,315,326 B2* | 11/2012 | Agee | H04L 5/0044 |
| | | | 375/267 |
| 8,417,987 B1 | 4/2013 | Goel et al. | |
| 8,849,104 B2 | 9/2014 | Eder | |
| 9,268,636 B2 | 2/2016 | Chung et al. | |
| 10,248,345 B1* | 4/2019 | Dickson | G06F 16/10 |
| 10,274,948 B2 | 4/2019 | Penilla et al. | |
| 11,089,105 B1* | 8/2021 | Karumbunathan | G06F 3/067 |
| 2004/0228414 A1* | 11/2004 | Keck | H04N 21/4348 |
| | | | 375/240.28 |
| 2008/0276156 A1* | 11/2008 | Gunnam | H03M 13/116 |
| | | | 714/801 |
| 2009/0327838 A1* | 12/2009 | Kottke | G06F 11/1008 |
| | | | 714/764 |
| 2012/0313817 A1* | 12/2012 | Underbrink | G01S 19/24 |
| | | | 342/357.72 |
| 2014/0309847 A1* | 10/2014 | Ricci | G08G 1/096811 |
| | | | 701/33.1 |
| 2015/0067442 A1* | 3/2015 | Shiozawa | G06F 11/0727 |
| | | | 714/764 |
| 2017/0139823 A1* | 5/2017 | Tomlin | G06F 3/067 |
| 2017/0147503 A1* | 5/2017 | de Silva | G06F 3/0652 |
| 2017/0372431 A1 | 12/2017 | Perl | |
| 2018/0107417 A1* | 4/2018 | Shechter | G06F 3/0656 |
| 2018/0203759 A1 | 7/2018 | Shaeffer et al. | |
| 2018/0260125 A1* | 9/2018 | Botes | G06F 3/065 |
| 2020/0226039 A1 | 7/2020 | Lee et al. | |
| 2020/0241956 A1 | 7/2020 | Son | |

\* cited by examiner

PARTITIONED MEMORY HAVING ERROR DETECTION CAPABILITY

TECHNICAL FIELD

Embodiments of the disclosure relate generally to memory sub-systems, and more specifically, relate to partitioned memory having error detection capability. For instance, embodiments of the present disclosure relate to partitioned memory having error detection capability to avoid high error rates while internally moving data from one partition to another partition within the memory without system controller intervention.

BACKGROUND

A memory sub-system can be a storage device, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
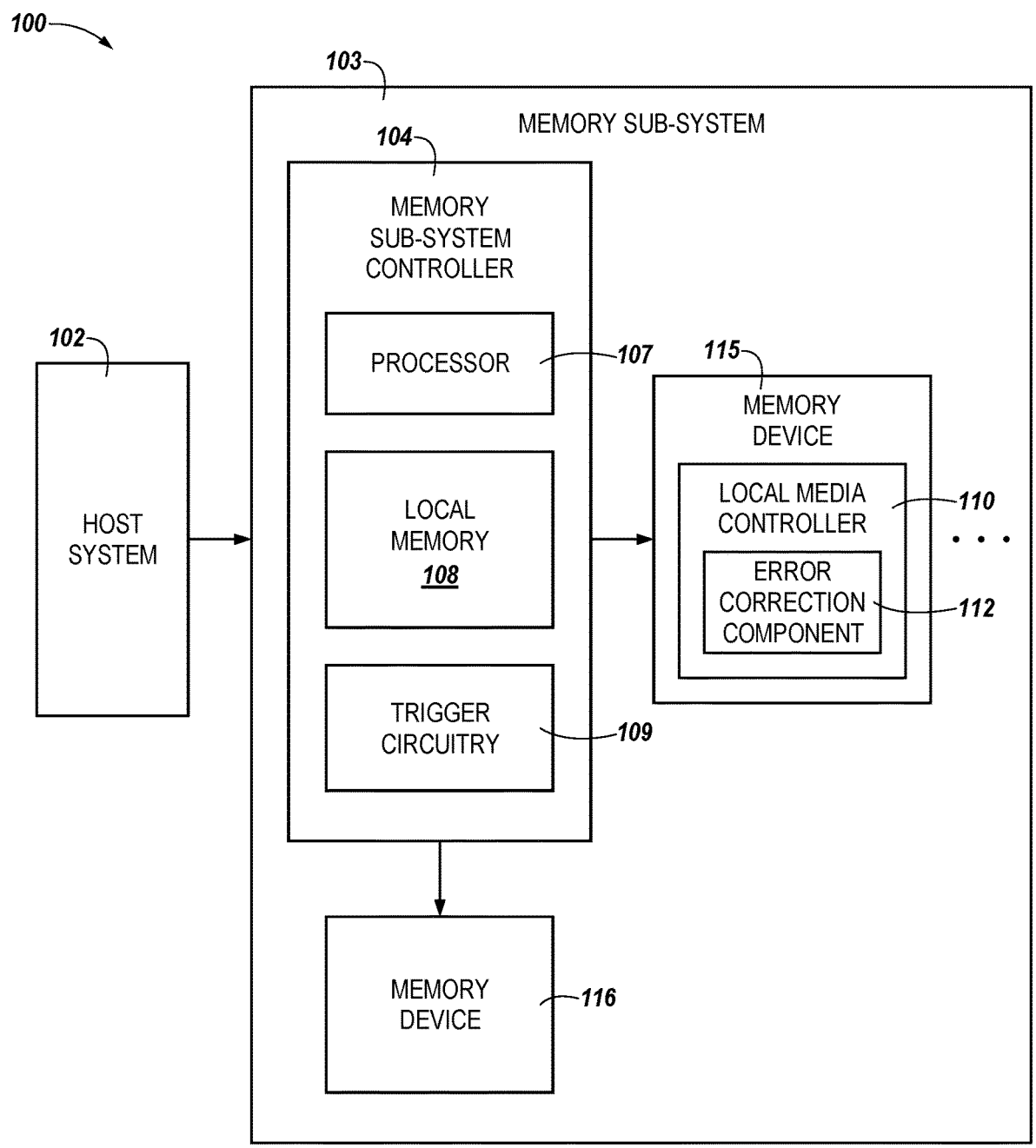
FIG. 1 illustrates an example computing environment that includes a memory sub-system in accordance with some embodiments of the present disclosure.

Aspects of the present disclosure are directed to partitioned memory having error detection capability. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A vehicle can include a memory sub-system, such as a solid-state drive (SSD). The memory sub-system can be used for data storage by various components of the vehicle, such as applications that are run by a host system of the vehicle. One example of such an application is an event recorder of the vehicle. The event recorder may also be referred to as a "black box" or "accident data recorder".

The emergence of autonomous vehicles, Internet of Things (IoT) and surveillance devices has resulted in a wider gap in between the total bytes written (TBW) in a useable lifetime of a memory sub-system and a user capacity of the memory sub-system. For example, the TBW to user capacity ratio for some memory sub-systems used for such applications has increased by one to three orders of magnitude. For instance, some autonomous vehicles require real time buffering of telemetric data captured by video cameras, radar, lidar, ultra-sonic and other sensors to playback sequences preceding an accident involving the vehicle. The data from these sensors can sum up to a substantial throughput requirement (e.g., a one GigaByte per second (GB/sec) sequential write throughput) from a host. Upon a trigger event, a quantity of buffered data corresponding to a predetermined playback time immediately preceding the event needs to be captured to determine the cause of an accident. The recorded telemetric sensor data corresponding to the predetermined playback time can be referred to as a "snapshot".

Accordingly, an event recorder for a vehicle (e.g., an autonomous vehicle) can be one application in which the user capacity requirement is low (e.g., 128 GB), but the TBW is high (e.g., hundreds of PetaBytes). The examples of such values given are not intended to be limiting, but rather highlight the relative difference between the requirements for user capacity and TBW in such an application.

Capturing and storing the buffered data from the sensors of the vehicle as a snapshot upon a trigger event can involve transferring (e.g., moving) the buffered sensor data from one memory portion (e.g., a buffer portion) of the memory sub-system of the event recorder to another memory portion (e.g., a snapshot portion) of the memory sub-system of the event recorder. For instance, in some approaches, the data can be sensed (e.g., read) from the buffer memory portion, and sent to a controller of the memory sub-system that is external to the memory. The external controller can detect and correct any errors in the data, and then send the corrected data back to the memory to be programmed to the snapshot memory portion. However, sending the data back and forth between the memory and the controller, and the correction of the errors by the controller, can take time and consume energy.

In some approaches, a copyback operation can be performed by the memory to move the data from the buffer memory portion to the snapshot memory portion without transferring the data between the memory and the external controller. Such an approach can reduce the amount of time and energy used to move the data from the buffer memory portion to the snapshot memory portion. However, any errors in the data in the buffer memory portion will also be copied to the snapshot memory portion in such an approach, which can cause corruption of the data stored in the snapshot portion.

Aspects of the present disclosure address the above and other deficiencies by having a memory sub-system that utilizes a component included in the memory of the sub-system to perform an error correction operation on a portion (e.g., a sample) of the data stored in the first (e.g., buffer) memory portion, and then performs a copyback operation to move the data from the buffer memory portion (e.g., all the data from the buffer portion, including the data corrected by the error correction operation) to another (e.g., the snapshot) memory portion if the error correction operation is successful. Such an approach can reduce the amount of time and energy used to move the data from the buffer memory portion to the snapshot memory portion by not transferring the data to or from an external controller, while also reducing (e.g., minimizing) the errors in the data moved to the snapshot portion by the copyback operation enough to prevent the data stored in the snapshot portion from being corrupted. If the error correction operation is not successful (e.g., if there are more errors in the data from the buffer portion than can be corrected by the component included in the memory), the data from the buffer portion can be sent to the external controller, which can correct the errors and program the data to the snapshot portion.

FIG. 1 illustrates an example computing environment 100 that includes a memory sub-system 103 in accordance with some embodiments of the present disclosure. The memory sub-system 103 can include media, such as one or more volatile memory devices (e.g., memory device 116), one or more non-volatile memory devices (e.g., memory device 115), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing environment 100 can include a host system 120 that is coupled to one or more memory sub-systems 102. In some embodiments, the host system 120 is coupled to different types of memory sub-system 103. FIG. 1 illustrates one example of a host system 120 coupled to one memory sub-system 103. The host system 120 uses the memory sub-system 103, for example, to write data to the memory sub-system 103 and read data from the memory sub-system 103. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a memory and a processing device. The host system 120 can be coupled to the memory sub-system 103 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 103. The host system 120 can further utilize an NVM Express (NVMe) interface to access the memory components (e.g., memory devices 115) when the memory sub-system 103 is coupled with the host system 120 by the PCIe interface. The physical host interface can provide an interface for passing control, address, data, and other signals between the memory sub-system 103 and the host system 120.

The memory devices can include any combination of the different types of non-volatile memory devices and/or volatile memory devices. The volatile memory devices (e.g., memory device 116) can be, but are not limited to, random access memory (RAM), such as dynamic random access memory (DRAM) and synchronous dynamic random access memory (SDRAM).

An example of non-volatile memory devices (e.g., memory device 115) includes a negative-and (NAND) type flash memory. Each of the memory devices 115 can include one or more arrays of memory cells such as single level cells (SLCs) or multi-level cells (MLCs) (e.g., triple level cells (TLCs) or quad-level cells (QLCs)). In some embodiments, a particular memory component can include an SLC portion, and an MLC portion, (e.g., a TLC portion or a QLC portion), of memory cells. Each of the memory cells can store one or more bits of data used by the host system 120. Furthermore, the memory cells of the memory devices 115 can be grouped as memory pages or memory blocks that can refer to a unit of the memory component used to store data.

Although non-volatile memory components such as NAND type flash memory are described, the memory device 115 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 104 can communicate with the memory devices 115 to perform operations such as reading data, writing data, or erasing data at the memory devices 115 and other such operations. The memory sub-system controller 104 can include hardware such as one or more integrated circuits and/or discrete components, a buffer memory, or a combination thereof. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can include a processor 107 (e.g., processing device) configured to execute instructions stored in a local memory 108. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 120.

In some embodiments, the local memory 108 can include memory registers storing memory pointers, fetched data, etc. The local memory 108 can also include read-only memory (ROM) for storing micro-code. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 120 and can convert the commands or operations into instructions or appropriate commands to achieve the desired access to the memory devices 115. The memory sub-system controller 104 can be responsible for other operations such as wear leveling operations, garbage collection operations, error detection and error-correcting code (ECC) operations, encryption operations, caching operations, and address translations between a logical block address and a physical block address that are associated with the memory devices 115. The memory sub-system controller 104 can further include host interface circuitry to communicate with the host system 120 via the physical host interface. The host interface circuitry can convert the commands received from the host system into command instructions to access the memory devices 115 as well as convert responses associated with the memory devices 115 into information for the host system 120.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory devices 115.

In some embodiments, the memory devices 115 include local media controllers 110 that operate in conjunction with memory sub-system controller 104 to execute operations on one or more memory cells of the memory devices 115. The local media controller 110 includes an error correction component 112 that can perform an error correction operation on a portion (e.g., a sample) of data stored in a portion of memory device 115. If the error correction operation is successful, local media controller 110 can perform a copyback operation to move the data to another portion of memory device 115, thereby reducing (e.g., minimizing) the errors in the data being transferred and preventing data corruption in the other portion of memory device 115 without having to transfer the data to memory sub-system controller 104 to be corrected. The error correction component can include, for instance, error correction code (ECC) circuitry. Further details with regards to the operations of error correction component 112 and local media controller 110 are described below.

For example, local media controller 110 can receive a signal from memory sub-system controller 104 that a trigger event has occurred. For instance, local media controller 110 can include trigger circuitry 109. The trigger circuitry 109 can comprise an ASIC that can handle information (e.g., sensor information) received in association with a particular event, such as a determination and/or detection of an accident associated with an autonomous vehicle. By way of example and not by way of limitation, a determination as may be made when sensor information is equal to or above a particular threshold value. For example, the threshold value may be a predetermined value programmed at a time of manufacture, or the threshold value may be a value set by programming in a field of use after manufacture. The threshold value may be a value relating to a level of pressure indication from a braking sensor on an autonomous vehicle, a deceleration value received from a sensor, a magnitude and timing abruptness change to a steering sensor, and/or indications relating thereto, etc. The trigger circuitry can provide a trigger event signal and provide the event information (e.g., sensor information) to the processor 107, which in turn can send the signal to local media controller 110 that a trigger event has occurred. As such, the trigger circuitry 109, in some embodiments, can cause the memory sub-system controller 104 and/or local media controller 110 to perform actions to control host data movement between a first memory portion (e.g., a cyclic buffer partition portion) of memory device 115 and a second memory portion (e.g., a snapshot partition portion) of memory device 115, as described according to embodiments herein.

In response to local media controller 110 receiving the signal that the trigger event has occurred, error correction component 112 can perform an error correction operation on a portion (e.g., a sample) of the data stored in the first portion of memory device 115 to correct any errors in the portion of data. The portion of the data on which the error correction operation is performed can be less than all of the data stored in the first portion of memory device 115 (e.g., the error correction operation is only performed on some of the data stored in the first portion of memory device 115). For example, the portion of data can include bytes of data stored at a particular interval, such as, for instance, every Nth byte of data stored, in the first portion of memory device 115. Because the portion of data is less than all of the data stored in the first portion of memory device 115 (e.g., because the error correction operation is not performed on all the data stored in the first portion of memory device 115), error correction component 112 can have a reduced size and complexity (e.g., less than that of error correction circuitry that may be included in memory sub-system controller 104) that enables error correction component 112 to be included in memory device 115.

Error correction component 112 can perform the error correction operation (e.g., correct the errors in the portion of data) using parity data. The parity data can be error protection data used to correct errors that may occur in the data stored in memory device 115 (e.g., in the first portion of memory device 115) during operation of memory sub-system 103. The parity data can be stored in a portion of the first portion of memory device 115, which can be, for instance, a spare portion (e.g., spare bytes) of the first portion. Because the error correction operation is not performed on all the data stored in the first portion of memory device 115, the amount of parity data used for the error correction operation (e.g., the size of the spare portion) can be reduced, thereby leaving more space for storing sensor data in the first portion of memory device 115.

The parity data can be generated and programmed (e.g., written) to the spare portion by error correction component 112. For example, the parity data can be generated and programmed by error correction component 112 while (e.g., in parallel with) other data (e.g., the sensor data) is being programmed to the first portion of memory device 115 by memory sub-system controller 104.

Performing the error correction operation can further include, for example, determining the quantity of erroneous data (e.g., the quantity of erroneous data bits) in the portion of data, and determining whether the quantity of erroneous data is less than a threshold quantity. For instance, the quantity of erroneous data bits to be corrected (e.g., flipped) during the error correction operation can correspond to the bit error rate associated with the error correction operation. The bit error rate can refer to the quantity of erroneous bits corresponding to an amount of erroneous data from the portion of data divided by the total amount of data in the portion of data (e.g., the sample size). As such, the bit error rate associated with the error correction operation can be determined by dividing the quantity of erroneous bits to be corrected during the error correction operation by the total quantity of data in the portion of data.

The threshold quantity can be a pre-defined quantity that corresponds to the error correction capability of error correction component 112. The error correction capability of error correction component 112, can be, for instance, the maximum quantity of erroneous data (e.g., the maximum bit error rate) that error correction component 112 is capable of correcting during an error correction operation. Hence, whether the error correction operation will be successful (e.g., whether error correction component 112 will be able to correct the errors in the portion of data) depends on whether the quantity of erroneous data in the portion of data is less than the threshold quantity (e.g., whether the bit error rate associated with error correction operation is less than the maximum bit error rate). For instance, if the quantity of erroneous data is less than threshold quantity, the error correction operation will be successful, but if the quantity of erroneous data is not less than the threshold quantity, the error correction operation will not be successful.

If the error correction operation is successful (e.g., if the quantity of erroneous data in the portion of data is less than the threshold quantity and error correction component 112 is able to correct the errors in the portion of data), local media controller 110 can copy the data stored in the first portion of memory device 115 to the second portion of memory device 115. For instance, local media controller 110 can perform a copyback operation to move the data from the first portion to the second portion, without transferring the data between (e.g., to and/or from) memory sub-system controller 104. The data copied (e.g., moved) to the second portion of memory device 115 can include all the data (e.g., all the sensor data) stored in the first portion of memory device 115, including the corrected (e.g., no longer erroneous) data.

If the error correction operation is not successful (e.g., if the quantity of erroneous data in the portion of data is not less than the threshold quantity and error correction component 112 is not able to correct the errors in the portion of data), local media controller 110 can send the data (e.g., all the data, including the erroneous data) stored in the first portion of memory device 115 to memory sub-system controller 104. In response to (e.g., upon) receiving the data stored in the first portion of memory device 115, memory subsystem controller 104 (e.g., an additional error correction component included in memory subsystem controller 104) can perform an error correction operation on the received data, and then program the received data (e.g., including the corrected data) to the second portion of memory device 115 after performing the error correction operation.

Figure 2:
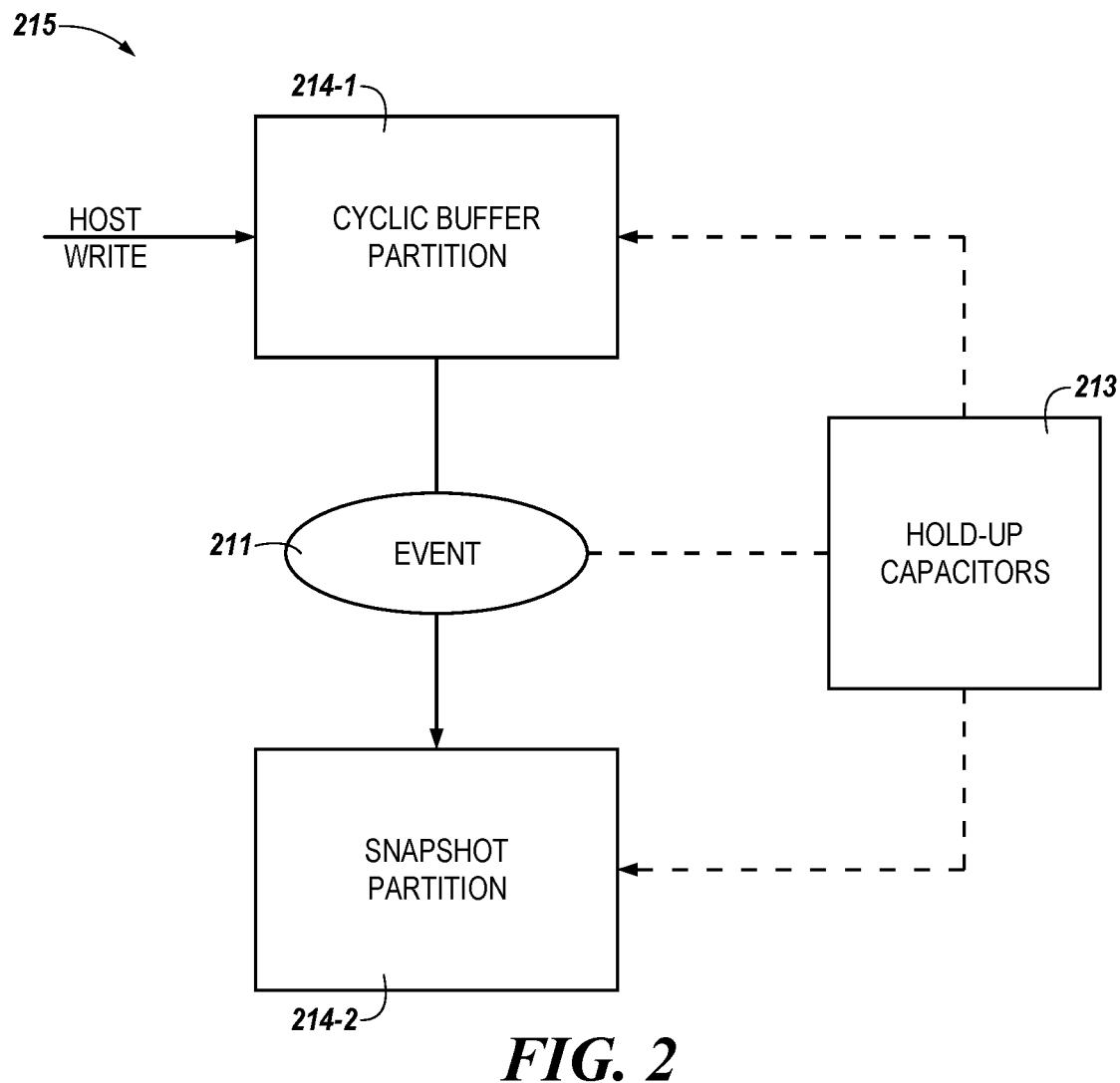
FIG. 2 illustrates an example of partitioned memory within a memory sub-system in accordance with some embodiments of the present disclosure.

FIG. 2 illustrates an example of partitioned memory 215 within a memory sub-system in accordance with some embodiments of the present disclosure. The partitioned memory 215 can be, for instance, memory device 115 of memory sub-system 103 previously described in connection with FIG. 1. As shown in FIG. 2, partitioned memory 215 can include a separate cyclic buffer partition portion 214-1 and snapshot partition portion 214-2.

In one example, host information (e.g., data) can be received by (e.g. programmed to) the partitioned memory 215 at a rate of at least one GigaByte per second (GB/sec). The host data can be received sequentially by the partitioned memory 215 and stored in sequence to a partition portion 214-1 (e.g., cyclic buffer partition portion) of the partitioned memory 215. In one example, the partition portion 214-1 is sized so that only the last thirty seconds of data is valid. In this example, at a 1 GB/sec. received data bandwidth, the partition portion 214-1 can have a logical size of thirty GB. As shown in the example of FIG. 2, a partition portion 214-2 (e.g., snapshot partition portion) of the partitioned memory 215 can be communicatively coupled to the partition portion 214-1. According to embodiments, based at least in part on a determination that an event has occurred, received host data can be copied from the partition portion 214-1 to the partition portion 214-2. In some embodiments, the determination that the event has occurred can include actuation of a trigger signal 211 by trigger circuitry (e.g., trigger circuitry 109 previously described in connection with FIG. 1), based at least in part upon received sensor information from a host being above a particular threshold (e.g., quantitative value). In some embodiments, the particular threshold can be a predetermined value programmed to the memory sub-system during manufacture of the memory sub-system. In other embodiments, the particular threshold can be a value programmed to the memory sub-system after manufacture of memory sub-system (e.g., programmed to the memory sub-system in the field of use).

In the example of FIG. 2, sets of data, sequentially received and stored in the partition portion 214-1, can be copied from the partition portion 214-1 to the partition portion 214-2 upon receiving the signal that the trigger event has occurred, as previously described herein. In some embodiments the partition portion 214-2 is sized to receive one or more sets of data from the partition portion 214-1 (e.g., a set of host data being copied from the partition portion 214-1 to the partition portion 214-2) each time the determination is made that an event has occurred. In one example the partition portion 214-2 is sized to receive at least eight sets of data from the partition portion 214-1. In this example, the partition portion 214-2 can have a logical size of 240 GBs. However, embodiments are not limited to this example. As used herein, a logical size of the partition portion 214-2 is referred to as "a user capacity" of the memory sub-system.

As shown in the example of FIG. 2 the copying (e.g., movement) of sets of data, sequentially received and stored in the partition portion 214-1, from the partition portion 214-1 to the partition portion 214-2, is powered by a non-volatile power supply 213 (e.g., a battery power supply such as hold-up capacitors). As shown in the example of FIG. 2, the power supply 213 is communicatively coupled to the partition portion 214-1 and the partition portion 214-2 to supply power to the partition portion 214-1 and the partition portion 214-2 of sufficient duration to copy at least a set of data of a particular size (e.g., snapshot size) sequentially received and stored in the partition portion 214-1, from the partition portion 214-1 to the partition portion 214-2. Thus, if a trigger event to copy sets of data, sequentially received and stored in the partition portion 214-1, from the partition portion 214-1 to the partition portion 214-2 is received in connection with a power supply loss to the memory sub-system (e.g., to the partitioned memory 215), then at least one set of data of a particular size (e.g., snapshot size), sequentially received and stored in the partition portion 214-1, can be copied from the partition portion 214-1 to the partition portion 214-2. In one example, the particular size (e.g., snapshot size) is associated with a reliability of the partition portion 214-1. The reliability of the partition portion 214-1 can be thirty seconds (e.g., a size of the partition portion 214-1 for host data received at a rate of 30 GB/sec). In such an example, the power supply 213 communicatively coupled to the partition portion 214-1 and the partition portion 214-2, is sized to provide a power supply of sufficient duration to the partition portion 214-1 and the partition portion 214-2 to copy the entire partition portion 214-1 to the partition portion 214-2 upon an event that causes an external power supply loss to the memory sub-system.

The cyclic buffer portion 214-1 can store significantly more data over the service life of the partitioned memory 215 than the snapshot portion 214-2. For example, the cyclic buffer portion 214-1 can store 3-4 orders of magnitude (1,000-10,000 times) more data than the snapshot portion 214-2. However, the cyclic buffer portion 214-1 does not have to have a larger storage capacity than the snapshot portion 214-2. The size (amount of memory) of the cyclic buffer portion 214-1 can be dependent, at least in part, on an endurance capability of the cyclic buffer portion 214-1. For example, if a host is expected to write 150 petabytes (PB) of data to the cyclic buffer portion 214-1 (TBW is 150 PB) and the endurance capability of the cyclic buffer portion 214-1 is 5 million PEC, then 30 GB of memory for the cyclic buffer portion 214-1 is sufficient to satisfy the TBW of 150 PB, provided that data stored by the cyclic buffer portion 214-1 is overwritten. In contrast, if the endurance capability of the cyclic buffer portion 214-1 is 500 thousand PEC, then 300 GB of memory for the cyclic buffer portion 214-1 is necessary to satisfy the TBW of 150 PB. Thus, it can be beneficial to improve (increase) an endurance capability of the partitioned memory 215 (e.g., an endurance capability of the cyclic buffer portion 214-1) so that a higher TBW requirement can be satisfied with a smaller amount of memory. Reducing the amount of memory can reduce manufacturing costs, operating costs, and/or improve performance of the partitioned memory 215.

In some embodiments the partitioned memory 215 is a non-volatile memory device (e.g., a NAND memory device) and the partition portion 214-1 and the partition portion 214-2 are included in the NAND memory device. In this example, the partition portion 214-1 can be an array of non-volatile memory cells of a particular type and/or programmed according to a particular characteristic (e.g., single level cells (SLCs) in a particular programming mode of operation). The partition portion 214-2 can be an array of non-volatile memory cells of a particular type and/or programmed according to a particular characteristic (e.g., triple level cells (TLCs) and/or quad-level cells (QLCs) in a particular programming mode of operation). According to embodiments, the partition portion 214-1 has one endurance characteristic and the partition portion 214-2 has another endurance characteristic. In some embodiments, a ratio of a Total Bytes Written (TBW) quantity to the partition portion 214-1 to a User Capacity (UC) storage size of the partition portion 214-2 is an order of magnitude in a range of 100× to 1000× greater than other applications.

Figure 3:
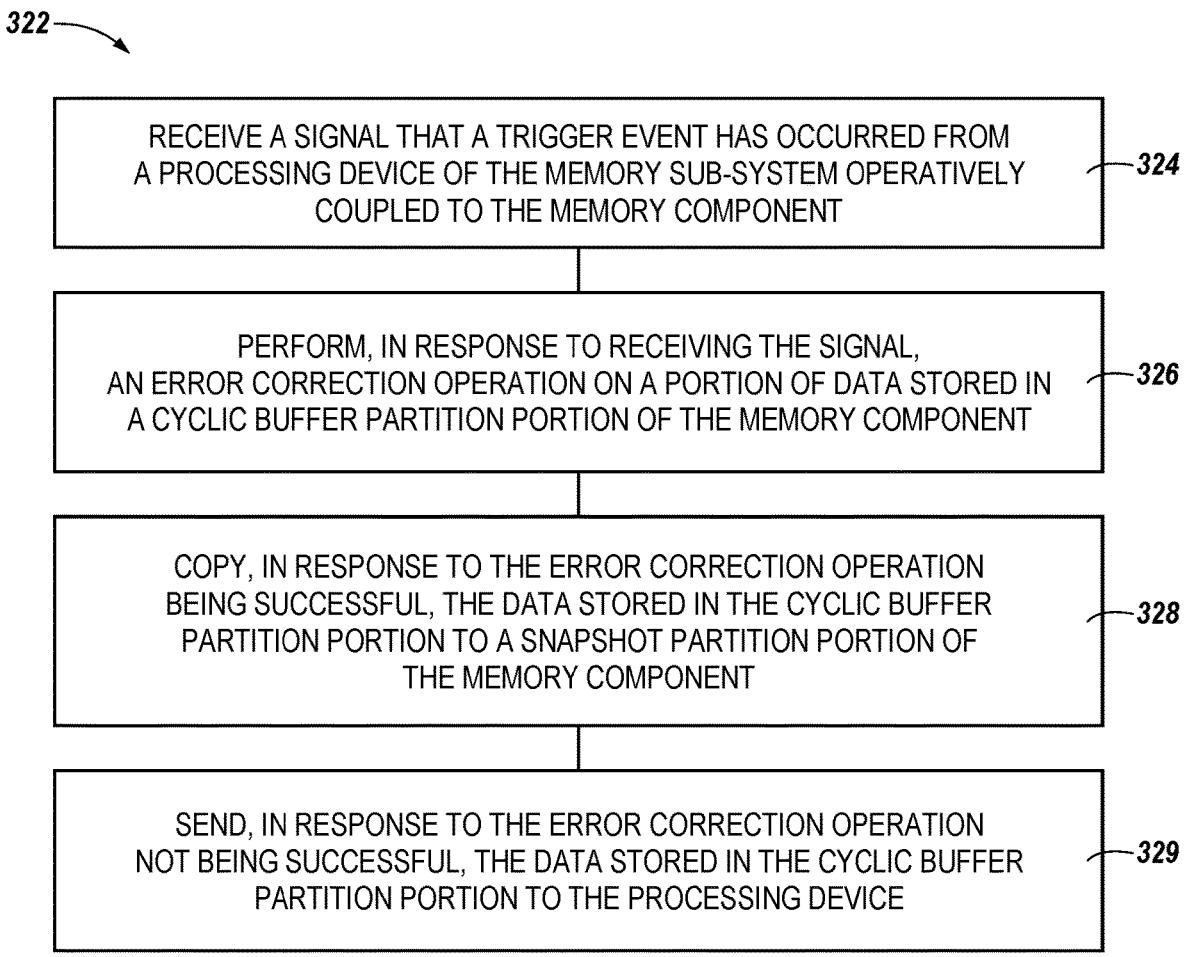
FIG. 3 is a flow diagram of an example method to copy, in response to a trigger event occurring, data from one memory portion to another memory portion in accordance with some embodiments of the present disclosure.

FIG. 3 is a flow diagram of an example method 322 to copy, in response to a trigger event occurring, data from one memory portion to another memory portion in accordance with some embodiments of the present disclosure. The method 322 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 322 is performed by a memory component of a memory sub-system. For example, the method 322 can be performed by local media controller 110 (e.g., error correction component 112) of memory device 115 of memory sub-system 103 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 324, the local media controller receives a signal that a trigger event has occurred from a processing device of the memory sub-system operatively coupled to the memory component. The processing device can be, for example, memory sub-system controller 104 of FIG. 1. The signal can be, for example, trigger signal 211 actuated by trigger circuitry of 109 FIG. 1 upon received sensor information from a host being above a particular threshold, as previously described herein.

At operation 326, the error correction component performs, in response to the local media controller receiving the signal, an error correction operation on a portion of data stored in a cyclic buffer partition portion of the memory component. The cyclic buffer partition portion can be, for example, cyclic buffer partition portion 214-1 of FIG. 2, and the portion of data can be less than all of the data stored therein, as previously described herein. The error correction operation can be performed using parity data stored in the cyclic buffer partition portion, and can include determining the quantity of erroneous data in the portion of data and determining whether the quantity of erroneous data is less than a threshold quantity, as previously described herein.

At operation 328, the local media controller copies, in response to the error correction operation being successful, the data stored in the cyclic buffer partition portion to a snapshot partition portion of the memory component. The snapshot partition portion can be, for example, snapshot partition portion 214-2 of FIG. 2, and the data copied to the snapshot partition portion can include all the data stored in the cyclic buffer partition portion, as previously described herein. The error correction operation is successful, for instance, if the quantity of erroneous data in the portion of data is less than the threshold quantity, as previously described herein. The local media controller can copy the data to the snapshot partition portion by, for example, performing a copyback operation, as previously described herein.

At operation 329, the local media controller sends, in response to the error correction operation not being successful, the data stored in the cyclic buffer partition portion to the processing device of the memory sub-system. The error correction operation is not successful, for instance, if the quantity of erroneous data in the portion of the data is not less than the threshold quantity, as previously described herein. The processing device can perform an error correction operation on the data, and then program the data to the snapshot partition portion, as previously described herein.

Figure 4:
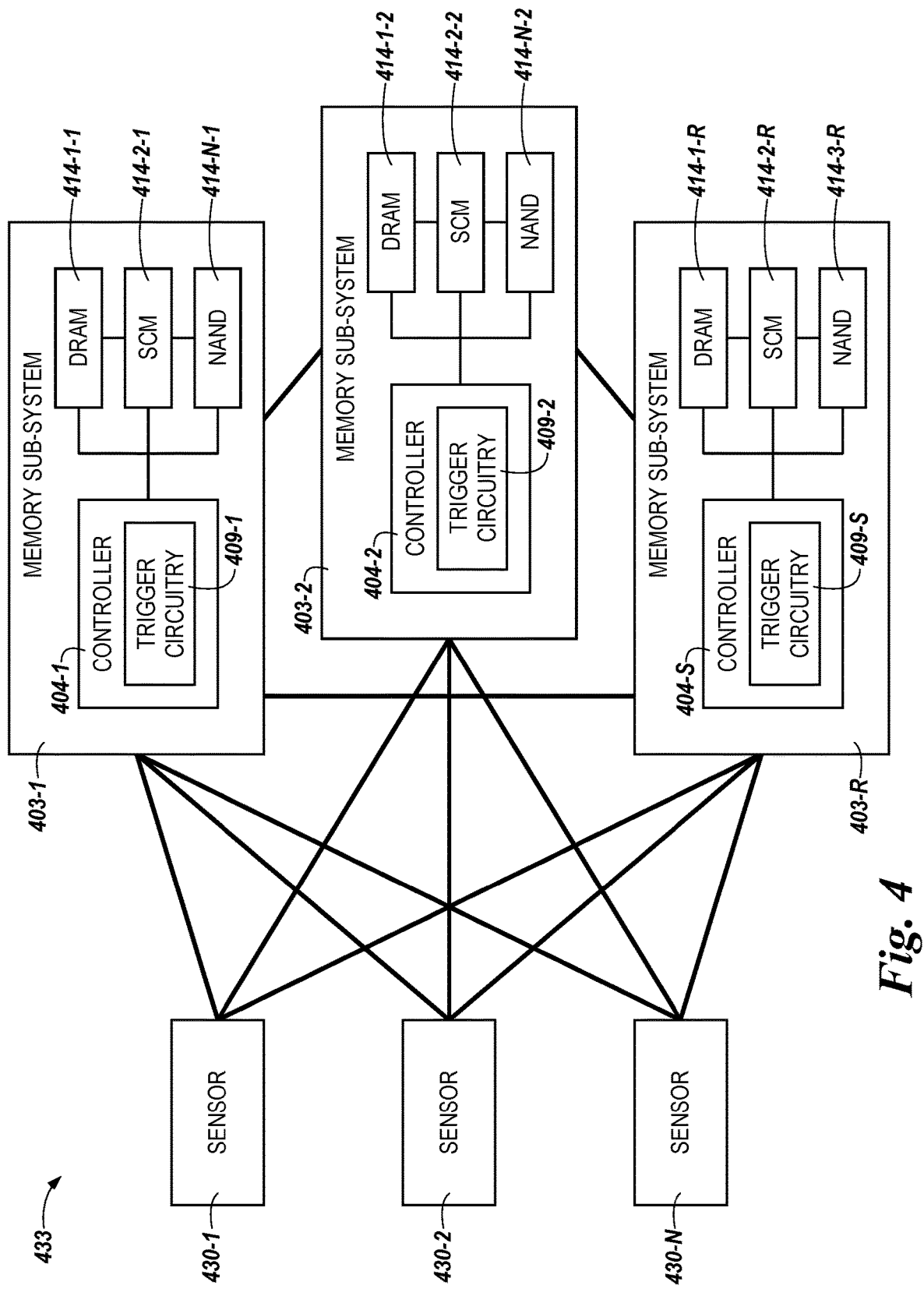
FIG. 4 illustrates an example computing system including one or more memory sensors communicatively coupled to one or more memory sub-systems in accordance with some embodiments of the present disclosure.

FIG. 4 illustrates a functional block diagram in the form of a computing system 433 including one or more memory sub-systems 403-1, 403-2, 403-R communicatively coupled with one or more sensors 430-1, 430-2, 430-N in accordance with a number of embodiments of the present disclosure. As used herein, the sensors 430-1, 430-2, 430-N can be collectively and/or independently referred to as the "sensor(s) 430". The memory sub-systems 403-1, 403-2, 403-R can be collectively and/or independently referred to herein as "memory sub-system(s) 403" and be analogous to the memory system 104 described in connection with FIG. 1. Each of the memory sub-system(s) 403 can respectively include a controller (e.g., processing device) 404-1, 404-2, and 404-S. The controller(s) 404-1, 404-2, and 404-S can be collectively and/or independently referred to herein as "controllers 404" and be analogous to the controller 104 described in connection with FIG. 1. The controllers 404 can further include trigger circuitry 409-1, 409-2, and 409-S respectively within the controller 404-1, 404-2, and 404-S. As described herein, the trigger circuitry 409-1, 409-2, and/or 409-S, in some embodiments, can cause the controllers 404 to perform actions to control host data movement between a first memory portion (e.g., a cyclic buffer partition portion) and a second memory portion (e.g., a snapshot partition portion). Each of the controllers 404 can be communicatively coupled to a memory sub-system 403 (e.g., and various types of volatile and/or non-volatile memory devices 414-1-1, 414-1-2, . . . , 414-3-R).

For example, memory sub-system 403-1 can include controller 404-1 and memory devices 414-1-1, 414-2-1, and 414-N-1. Memory sub-system 403-2 can include controller 404-2 and memory devices 414-1-2, 414-2-2, . . . , 414-N-2 (e.g., DRAM device 414-1-2, SCM device 414-2-2, and NAND device 414-N-2). Memory sub-system 403-R can include controller 404-S and memory devices 414-1-R, 414-2-R, 414-3-R. Memory devices can be the same type of memory device and/or different memory device types (e.g., example, DRAM device 414-1-R, SCM device 414-2-R, NAND device 414-3-R, etc.). Embodiments are not so limited, however, and each memory system 403 can include any number and combination of memory devices.

The embodiment of FIG. 4 illustrates an example of a computing system 433 in which each sensor 430 is communicatively coupled to each memory sub-system 403, and each memory sub-system 403-1, 403-2, and 403-R is communicatively coupled to each other. Although not illustrated as to not obscure the examples of the disclosure, the sensors 430 and the memory sub-system(s) 403 can be communicatively coupled to a host (e.g., an autonomous vehicle).

In a non-limiting embodiment where the host is a vehicle, and a sensor 430-1 is a camera sensor, a sensor 430-2 is a temperature sensor, and a sensor 430-N is acoustic sensor, the memory system 403 can receive information (e.g., data) from all of the sensors 430. A memory system 403-1 can be related to a braking system embedded unit of the vehicle and can have data attributes related to the camera sensor 430-1, the temperature sensor 430-2 or the acoustic sensor 430-N. In another example, a memory system 403-2 can be related to a heating/cooling embedded unit and data from temperature sensor 430-2—and/or the acoustic sensor 430-N. In yet another example, a memory device 403-R can be related to an ambient noise embedded unit a having information related to the acoustic sensor 430-N.

Each of the controllers 404 can receive data from each of the sensors 430 as the sensors 430 generate the data. Each of the controllers 404 can store the data sequentially in a memory device and the controller 404 (e.g., a processing device) can execute instructions associated with a machine learning algorithm to iteratively compare and analyze the received sensor information (e.g., data). For example, the controller 404-1 can receive data from each of the sensors 430-1, 430-2, and 430-N. The controller 404-1 can determine information about sensor information where the information of the sensors 430 are related to a function, a location relative to the host, etc. For example, the controller 404-1 can receive data from the camera sensor 430-1 and determine the sensor information is related to an image included in the data saved in memory device(s) 414-1, 418-1, and/or 416-1. Further, the memory sub-system 403-1 can compare the sensor information received in current time with sensor information received in different periods of time and process it via machine learning. Based on the processed, analyzed, and/or learned information the host can signal trigger circuitry associated with a memory sub-system (e.g., trigger circuity 109 in memory sub-system 103 in FIG. 1) to perform memory sub-system control operations described herein.

In another example, the controller 404-S can receive data from each of the sensors 430-1, 430-2, and 430-N. The controller 404-S can determine sensor information received from host where the information is related to an acoustic function of the sensors 430. Specifically, the controller 404-S can receive sensor information from the sensor 430-N (e.g., an acoustic sensor) and determine the information about the sensor information is related to audio information included in the data. The controller 404-S can compare the audio information received in current time with audio information received in different periods of time and process the information via machine learning. Again, based on the processed, analyzed, and/or learned information the host can signal trigger circuitry associated with a memory sub-system (e.g., trigger circuity 109 in memory sub-system 103 in FIG. 1) to perform memory sub-system control operations described herein.

Figure 5:
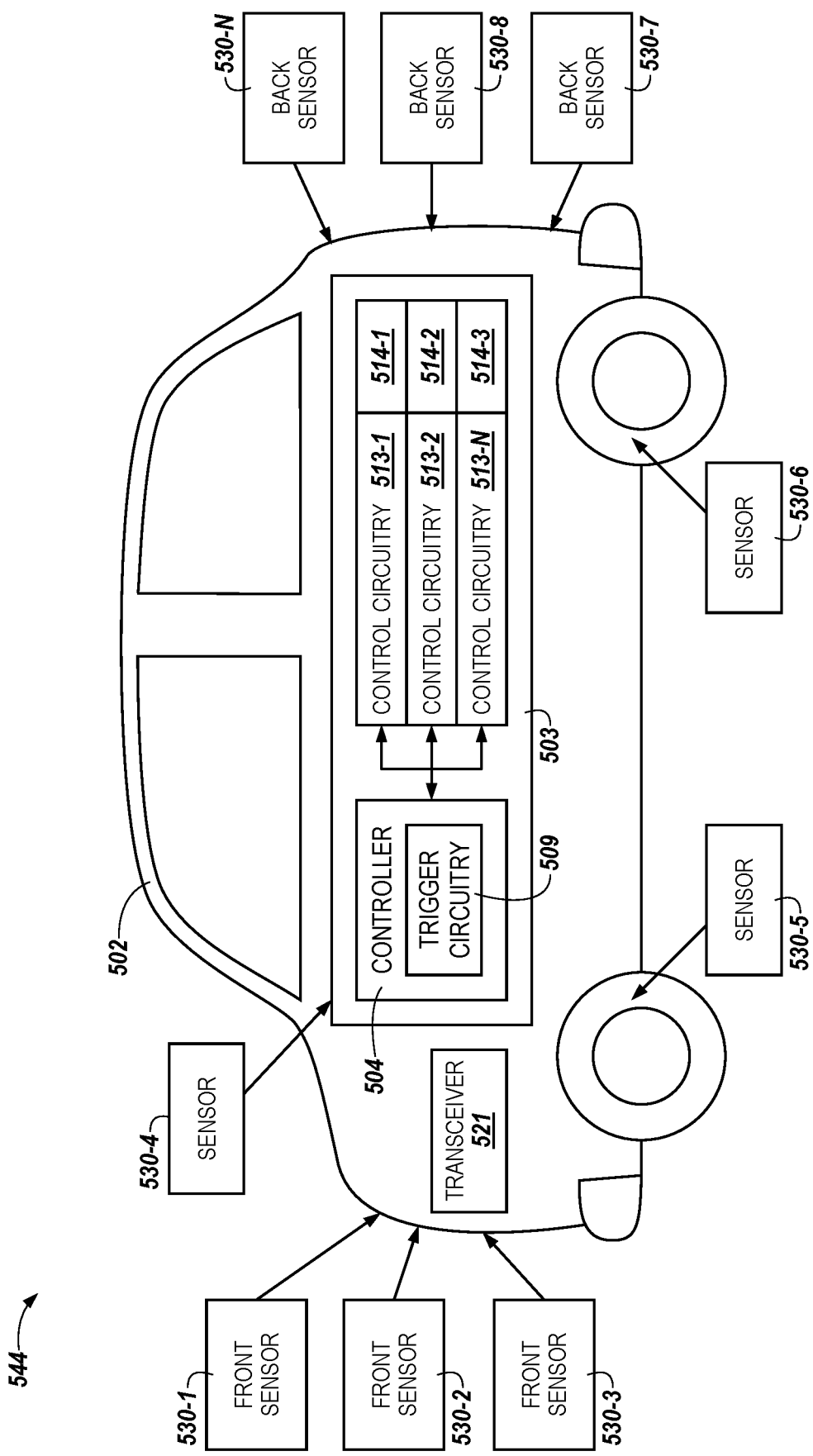
FIG. 5 illustrates an example of a computing system including a memory sub-system deployed on a host in the form of a vehicle in accordance with some embodiments of the present disclosure.

FIG. 5 illustrates an example of a computing system 544 including a memory sub-system 503 deployed on a host 502 in the form of a vehicle in accordance with some embodiments of the present disclosure. The host 502 can include a host controller 504 which can be analogous to controller 404 described in connection with FIG. 4. The controller 504 can include trigger circuitry 509, which can be analogous to the trigger circuitry described in connection with FIG. 1. As described herein, the trigger circuitry 509, in some embodiments, can cause the controller 504 to perform actions to control host data movement between a first memory portion (e.g., a cyclic buffer partition portion) and a second memory portion (e.g., a snapshot partition portion). The host 502 can be communicatively coupled to sensors 530-1, 530-2, 530-3, . . . , 530-7, 530-8, 530-N which can be collectively and/or independently referred to as the "sensor(s) 530" and be analogous to sensors 530 described in connection with FIG. 4. The memory sub-system 503 can be analogous to memory sub-system 103 described in connection with FIG. 1 and include one or more media devices. The memory sub-system 503 can include a memory device 514-1 (e.g. DRAM) including control circuitry 513-1, a memory device 514-2 (e.g., SCM) including control circuitry 513-2, and/or a memory device 513-3 (e.g., NAND) including control circuitry 513-N. Embodiments are not so limited, however, and memory system 503 can include any number or combination of memory devices (e.g., non-volatile and/or volatile).

The computing system 544, and thus the host 502, can be coupled to a number of sensors 530 either directly, as illustrated for sensor 530-4, or via a transceiver 521, as illustrated for sensors 530-1, 530-2, 530-3, 530-5, 530-6, 530-7, 530-8, . . . , 530-N. The transceiver 521 is able to receive time based telemetric sensor data from the sensors 530 wirelessly, such as by radio frequency communication. In at least one embodiment, each of the sensors 530 can communicate with the computing system 544 wirelessly via the transceiver 521.

The example host 502 is in the form of a vehicle. A vehicle can include a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, and/or anything used for transporting people and/or goods. The sensors 530 are illustrated in FIG. 5 as including their attributes. For example, sensors 530-1, 530-2, and 530-3 can be camera sensors collecting data from the front of the vehicle host 502. Sensors 530-4, 530-5, and 530-6 are microphone sensors collecting data from the from front, middle, and back of the vehicle host 502. The sensors 530-7, 530-8, and 530-N are camera sensors collecting data from the back of the vehicle host 502.

The host controller 504 can be a controller designed to assist in automation endeavors of a vehicle host 502. For example, the host controller 504 can be an advanced driver assistance system controller (ADAS). An ADAS can monitor data to prevent accidents and provide warning of potentially unsafe situations. For example, the ADAS can monitor sensors in a vehicle host 502 and take control of the vehicle host 502 operations to avoid accident or injury (e.g., to avoid accidents in the case of an incapacitated user of a vehicle). A host controller 504 such as an ADAS can need to act and make decisions quickly to avoid accidents. The memory sub-system 503, e.g., memory system, can store reference data in memory devices such that new data received from the sensors 530 can be compared to the reference data such that quick decisions can be made by the host controller 504.

The reference data stored in the memory sub-systems can be data that the host controller 504 has determined is relevant to the host 502. Reference data can be data aggregated from sensors 530 over a period of time. For example, the reference data associated with the front sensors 530-1, 530-2, 530-3 can include data collected of a route frequently traversed by the vehicle host 502. In this way, when the vehicle host 502 is traveling forward, the front sensors 530-1, 530-2, and 530-3 can transmit information to the host controller 504. The host controller 504 can compare and/or analyze the new data received to reference data stored, process by executing instructions associated with a machine learning algorithm and, based at least in part on the comparison and/or analysis, determine an instructive action. The instructive action can include predictive action, based on new information being received for the first time relevant to the location of the vehicle on the roadway. The instructive action can include a preventative action based on previous experience received in different periods of time relevant to the location of the vehicle on the roadway.

Figure 6:
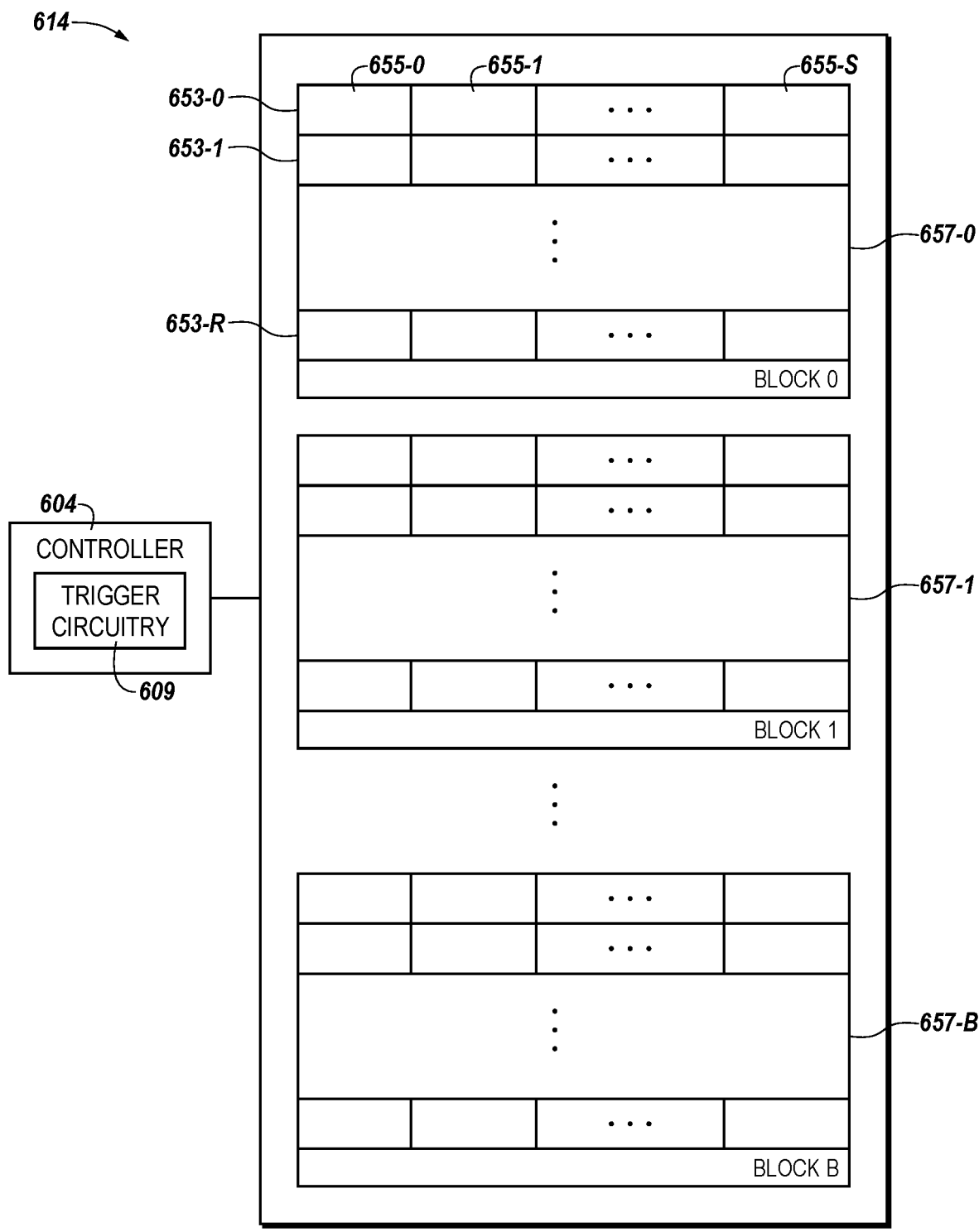
FIG. 6 illustrates a diagram of a portion of a memory array having a number of physical blocks in accordance with some embodiments of the present disclosure.

FIG. 6 illustrates a diagram of a portion of a memory array 614 having a number of physical blocks and coupled to a memory sub-system controller 604 in accordance with some embodiments of the present disclosure. The memory sub-system controller 604 can be analogous to memory sub-system controller 104 described in connection with FIG. 1. The controller 604 can include trigger circuitry 609, which can be analogous to the trigger circuitry described in connection with FIG. 1. As described herein, the trigger circuitry 609, in some embodiments, can cause the controller 604 to perform actions to control host data movement between a first memory portion (e.g., a cyclic buffer partition portion) and a second memory portion (e.g., a snapshot partition portion).

Memory array 614 can be, for example, a NAND flash memory array. As an additional example, memory array 614 can be a storage class memory (SCM) array, such as, for instance, a three-dimensional cross-point memory array, a ferroelectric RAM (FRAM) array, or a resistance variable memory array such as a PCRAM, RRAM, or spin torque transfer (STT) array, among others. Further, although not shown in FIG. 6, memory array 614 can be located on a particular semiconductor die along with various peripheral circuitry associated with the operation thereof.

As shown in FIG. 6, memory array 614 has a number of physical blocks 657-0 (BLOCK 0), 657-1 (BLOCK 1), . . . , 657-B (BLOCK B) of memory cells. The memory cells can be operated and/or programmed according to a particular programming characteristic (e.g., programming mode) as single level cells and/or multilevel cells such as, for instance, two level cells, triple level cells (TLCs) or quadruple level cells (QLCs), and/or penta-level cells (PLC). As an example, the number of physical blocks in memory array 614 can be 128 blocks, 512 blocks, or 1,024 blocks, but embodiments are not limited to a particular power of two or to any particular number of physical blocks in memory array 614.

A number of physical blocks of memory cells (e.g., blocks 657-0, 657-1, . . . , 657-B) can be included in a plane of memory cells, and a number of planes of memory cells can be included on a die. For instance, in the example shown in FIG. 6, each physical block 657-0, 657-1, . . . , 657-B can be part of a single die. That is, the portion of memory array 614 illustrated in FIG. 6 can be a die of memory cells.

As shown in FIG. 6, each physical block 657-0, 657-1, . . . , 657-B includes a number of physical rows (e.g., 653-0, 653-1, . . . , 653-R) of memory cells coupled to access lines (e.g., word lines). The number of rows (e.g., word lines) in each physical block can be 32, but embodiments are not limited to a particular number of rows 653-0, 653-1, . . . , 653-R per physical block. Further, although not shown in FIG. 7, the memory cells can be coupled to sense lines (e.g., data lines and/or digit lines).

As one of ordinary skill in the art will appreciate, each row 653-0, 653-1, . . . , 653-R can include a number of pages of memory cells (e.g., physical pages). A physical page refers to a unit of programming and/or sensing (e.g., a number of memory cells that are programmed and/or sensed together as a functional group). In the embodiment shown in FIG. 6, each row 653-0, 653-1, . . . , 653-R comprises one physical page of memory cells. However, embodiments of the present disclosure are not so limited. For instance, in an embodiment, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 6, a page of memory cells can comprise a number of physical sectors 655-0, 655-1, . . . , 655-S (e.g., subsets of memory cells). Each physical sector 655-0, 655-1, . . . , 655-S of cells can store a number of logical sectors of data. Additionally, each logical sector of data can correspond to a portion of a particular page of data. As an example, one logical sector of data stored in a particular physical sector can correspond to a logical sector corresponding to one page of data, and the other logical sector of data stored in the particular physical sector can correspond to the other page of data. Each physical sector 655-0, 655-1, ..., 655-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA can also correspond (e.g., dynamically map) to a physical address, such as a physical block address (PBA), that can indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 657-0, 657-1, ..., 657-B, rows 653-0, 653-1, ..., 653-R, sectors 655-0, 655-1, ..., 655-S, and pages are possible. For example, rows 653-0, 653-1, ..., 653-R of physical blocks 657-0, 657-1, ..., 657-B can each store data corresponding to a single logical sector which can include, for example, more or less than 512 bytes of data. Further, memory array 614 can be partitioned (e.g., into a cyclic buffer portion and snapshot partition portion, as previously described herein) using addresses to delineate pages, blocks, etc.

Figure 7:
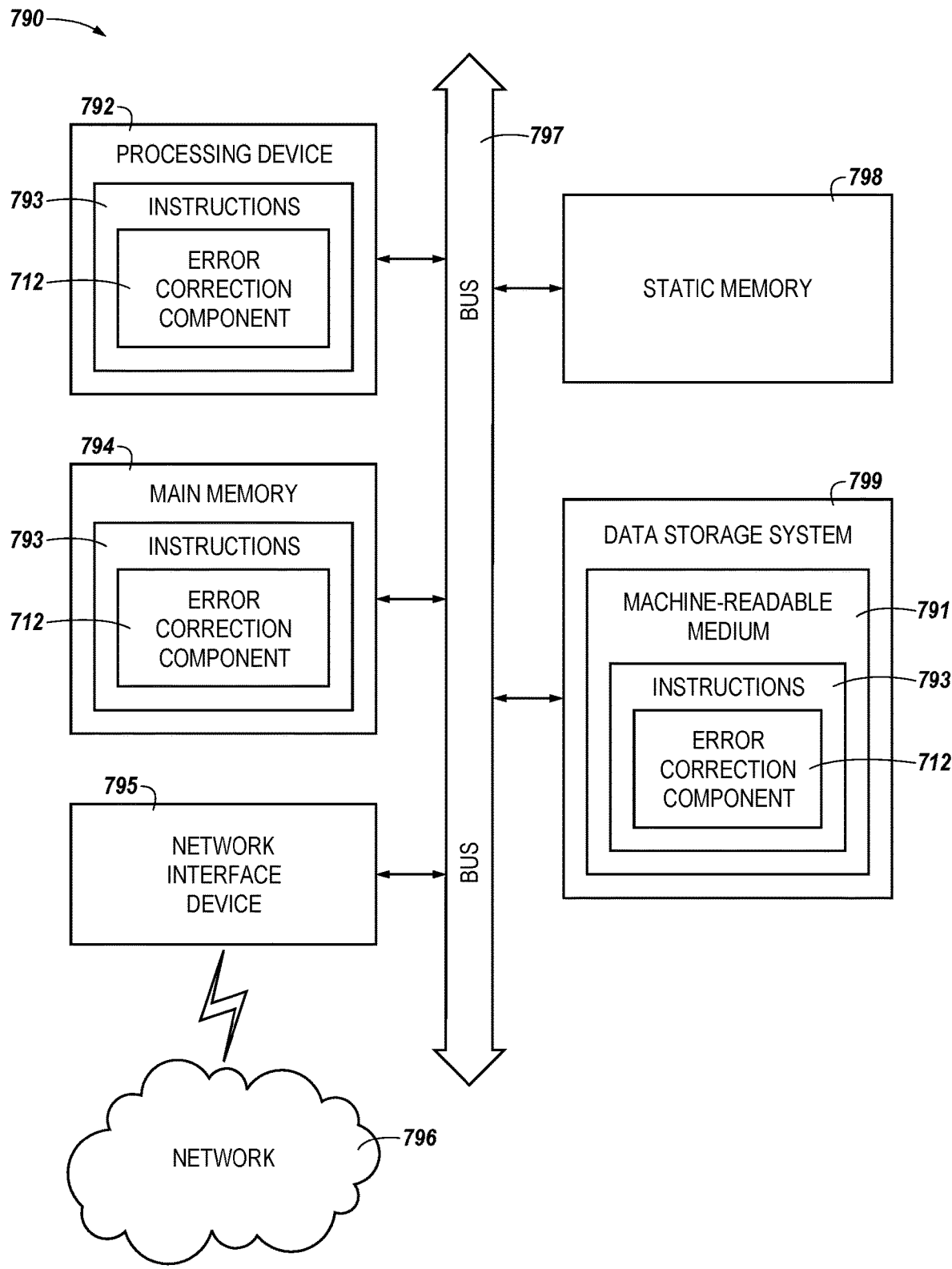
FIG. 7 is a block diagram of an example computer system in which embodiments of the present disclosure may operate.

FIG. 7 illustrates an example machine of a computer system 790 within which a set of instructions, for causing the machine to perform any one or more of the methodologies discussed herein, can be executed. In some embodiments, the computer system 790 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to execute an operating system to perform operations corresponding to the local media controller 110 and error correction component 112 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 790 includes a processing device 792, a main memory 794 (e.g., read-only memory (ROM), flash memory, dynamic random access memory (DRAM) such as synchronous DRAM (SDRAM) or RDRAM, etc.), a static memory 798 (e.g., flash memory, static random access memory (SRAM), etc.), and a data storage system 799, which communicate with each other via a bus 797.

Processing device 792 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 792 can also be one or more special-purpose processing devices such as an application specific integrated circuit (ASIC), a field programmable gate array (FPGA), a digital signal processor (DSP), network processor, or the like. The processing device 792 is configured to execute instructions 793 for performing the operations and steps discussed herein. The computer system 790 can further include a network interface device 795 to communicate over the network 796.

The data storage system 799 can include a machine-readable storage medium 791 (also known as a computer-readable medium) on which is stored one or more sets of instructions 793 or software embodying any one or more of the methodologies or functions described herein. The instructions 793 can also reside, completely or at least partially, within the main memory 794 and/or within the processing device 792 during execution thereof by the computer system 790, the main memory 794 and the processing device 792 also constituting machine-readable storage media. The machine-readable storage medium 791, data storage system 799, and/or main memory 794 can correspond to the memory sub-system 103 of FIG. 1.

In one embodiment, the instructions 793 include instructions to implement functionality corresponding to error correction component 712 (e.g., error correction component 112 of FIG. 1). While the machine-readable storage medium 791 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

As used herein, the designator "N", "R", "S", and "B", particularly with respect to reference numerals in the drawings, indicates that a number of the particular feature so designated can be included with a number of embodiments of the present disclosure. Additionally, as used herein, "a", "an", or "a number of" can refer to one or more of something, and "a plurality of" can refer to more than one of such things. For example, a memory device can refer to one or more memory devices, and a plurality of memory devices can refer to two or more memory devices.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 712 in FIG. 7.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a memory component comprising a cyclic buffer partition portion and a snapshot partition portion; and
a processing device included in the memory component to:
receive, from a sensor of a vehicle host, a signal that the sensor has detected a quantity above a threshold quantity that indicates the vehicle host has been involved in a vehicular accident; and
in response to receiving the signal that the sensor has detected the quantity above the threshold quantity that indicates the vehicle host has been involved in the vehicular accident:
perform an error correction operation on a portion of data stored in the cyclic buffer partition portion;
copy the data stored in the cyclic buffer partition portion to the snapshot partition portion without transferring the data to or from a processing device operatively coupled to the memory component in response to the error correction operation being successful; and
send the data stored in the cyclic buffer partition portion to the processing device operatively coupled to the memory component in response to the error correction operation not being successful.

2. The system of claim 1, wherein the portion of data on which the error correction operation is performed comprises less than all of the data stored in the cyclic buffer partition portion.

3. The system of claim 1, wherein the data copied to the snapshot partition portion comprises all of the data stored in the cyclic buffer partition portion.

4. The system of claim 1, wherein the processing device included in the memory component is to:
generate parity data for the error correction operation; and
program the parity data to a portion of the cyclic buffer partition portion.

5. The system of claim 4, wherein the portion of the cyclic buffer partition portion to which the parity data is programmed is a spare portion of the cyclic buffer partition portion.

6. The system of claim 4, wherein the processing device included in the memory component is to generate the parity data and program the parity data while data is being programmed to the cyclic buffer partition portion by the processing device operatively coupled to the memory component.

7. The system of claim 1, wherein the memory component further comprises hold-up capacitors to provide a power supply to the cyclic buffer partition portion and the snapshot partition portion in response to the signal that the sensor has detected the quantity above the threshold quantity that indicates the vehicle host has been involved in the vehicular accident.

8. The system of claim 1, wherein the processing device included in the memory component comprises an error correction component.

9. The system of claim 1, wherein:
the cyclic buffer partition portion is configured to store a first number of bits per memory cell; and
the snapshot partition portion is configured to store a second number of bits per memory cell, wherein the second number of bits is equal to or greater than the first number of bits.

10. A method, comprising:
receiving, by a processing device of a memory subsystem from a sensor of a vehicle host, a signal that the sensor has detected a quantity above a threshold quantity that indicates the vehicle host has been involved in a vehicular accident;

receiving, by a memory component of the memory subsystem, the signal that the sensor has detected the quantity above the threshold quantity that indicates the vehicle host has been involved in the vehicular accident from the processing device of the memory sub-system, wherein the processing device is operatively coupled to the memory component;

performing, by the memory component in response to receiving the signal that the sensor has detected the quantity above the threshold quantity that indicates the vehicle host has been involved in the vehicular accident, an error correction operation on a portion of data stored in a cyclic buffer partition portion of the memory component;

copying, by the memory component in response to the error correction operation being successful, the data stored in the cyclic buffer partition portion to a snapshot partition portion of the memory component without transferring the data to or from the processing device; and sending, by the memory component in response to the error correction operation not being successful, the data stored in the cyclic buffer partition portion to the processing device.

11. The method of claim 10, wherein performing the error correction operation on the portion of data comprises determining whether a quantity of erroneous data in the portion of data is less than an additional threshold quantity.

12. The method of claim 10, wherein copying the data stored in the cyclic buffer partition portion to the snapshot partition portion comprises performing a copyback operation to move the data from the cyclic buffer partition portion to the snapshot partition portion.

13. The method of claim 10, wherein the method further comprises:

performing, by the processing device in response to receiving the data stored in the cyclic buffer partition portion from the memory component, an error correction operation on the received data; and programming, by the processing device, the received data to the snapshot partition portion after performing the error correction operation on the received data.

14. The method of claim 10, wherein the vehicle host is an autonomous vehicle host.

15. The method of claim 10, wherein the data stored in the cyclic buffer partition portion comprises data sequentially programmed to the cyclic buffer partition portion by the processing device.

16. A non-transitory computer-readable storage medium comprising instructions that, when executed by a processing device, cause the processing device to:

receive, by a processing device of a memory sub-system from a sensor of a vehicle host, a signal that the sensor has detected a quantity above a threshold quantity that indicates the vehicle host has been involved in a vehicular accident;

receive the signal that the sensor has detected the quantity above the threshold quantity that indicates the vehicle host has been involved in the vehicular accident from the processing device of the memory sub-system;

determine, in response to receiving the signal that the sensor has detected the quantity above the threshold quantity that indicates the vehicle host has been involved in the vehicular accident, a quantity of erroneous data in a portion of data stored in a cyclic buffer partition portion of a memory component of the memory sub-system operatively coupled to the processing device of the memory sub-system;

determine whether the quantity of erroneous data is less than an additional threshold quantity;

correct the erroneous data and copy the data stored in the cyclic buffer partition portion of the memory component to a snapshot partition portion of the memory component without transferring the data to or from the processing device of the memory sub-system in response to determining the quantity of erroneous data is less than the additional threshold quantity; and send the data stored in the cyclic buffer partition portion of the memory component to the processing device of the memory sub-system in response to determining the quantity of erroneous data is not less than the additional threshold quantity.

17. The non-transitory computer-readable storage medium of claim 16, wherein the portion of data stored in the cyclic buffer partition portion of the memory component comprises bytes of data stored at a particular interval in the cyclic buffer partition portion.

18. The non-transitory computer-readable storage medium of claim 16, wherein the additional threshold quantity is a pre-defined threshold quantity.

19. The non-transitory computer-readable storage medium of claim 16, wherein the additional threshold quantity corresponds to an error correction capability of the processing device.

20. The non-transitory computer-readable storage medium of claim 16, wherein the data copied to the snapshot partition portion of the memory component comprises the corrected data.

* * * * *